(12) United States Patent
Volke et al.

(10) Patent No.: US 7,256,937 B2
(45) Date of Patent: Aug. 14, 2007

(54) STRUCTURED POLARIZER AND METHOD FOR MAKING THE SAME

(75) Inventors: André Volke, Zerbst (DE); Günter Heine, Berlin (DE); Hans-Joachim Cornelius, Fahrland (DE)

(73) Assignee: Codixx AG, Barleben (DE)

( * ) Notice: Subject to any disclaimer, the term of this patent is extended or adjusted under 35 U.S.C. 154(b) by 298 days.

(21) Appl. No.: 10/210,478

(22) Filed: Aug. 1, 2002

(65) Prior Publication Data

US 2003/0227669 A1   Dec. 11, 2003

(30) Foreign Application Priority Data

Jun. 6, 2002   (DE) ................................ 102 25 345

(51) Int. Cl.
   *G02B 5/30* (2006.01)
(52) U.S. Cl. ................ 359/501; 359/489; 359/497
(58) Field of Classification Search ................ 349/96, 349/117; 264/435; 359/489, 497, 500–501, 359/567
   See application file for complete search history.

(56) References Cited

U.S. PATENT DOCUMENTS

| | | | | |
|---|---|---|---|---|
| 2,203,687 | A * | 6/1940 | Mahler et al. ................ 352/58 |
| 3,682,531 | A * | 8/1972 | Jeffers ........................ 359/493 |
| 3,807,072 | A * | 4/1974 | Luxon, Jr. .................... 40/433 |
| 5,038,041 | A * | 8/1991 | Egan ........................... 250/349 |
| 5,122,890 | A * | 6/1992 | Makow ........................ 349/96 |
| 5,310,511 | A * | 5/1994 | Marcus ........................ 264/435 |
| 5,691,788 | A * | 11/1997 | Kim .............................. 349/96 |
| 5,973,831 | A * | 10/1999 | Kleinberger et al. ........ 359/465 |
| 6,423,968 | B1 | 7/2002 | Panzer et al. |
| 6,734,936 | B1 * | 5/2004 | Schadt et al. ............... 349/117 |
| 6,785,050 | B2 * | 8/2004 | Lines et al. ................. 359/486 |
| 2005/0052745 | A1 * | 3/2005 | Lee .............................. 359/567 |

FOREIGN PATENT DOCUMENTS

| | | |
|---|---|---|
| DE | 198 29 970 A1 | 1/2000 |
| DE | 100 65646 A1 | 6/2000 |
| EP | 1095298 B1 | 1/2000 |

* cited by examiner

*Primary Examiner*—Stephone B. Allen
*Assistant Examiner*—Derek S. Chapel
(74) *Attorney, Agent, or Firm*—Christa Hildebrand; Norris McLaughlin & Marcus, P.A.

(57) ABSTRACT

A structured polarizer (linear polarizing filter) with side-by-side in a plane (lateral) regions having different polarization directions, complete extinction and complete transparency, is presented with two superpositioned planes (polarizers) with a polarizer whose surface can be structured. The polarization properties of a plane is structured in such a way and the planes are mutually oriented in such a way that polarizing regions with different polarization directions and/ or polarization properties, such as contrast, polarization-direction-dependent absorption properties as a function of the wavelength, and/or non-polarizing regions, such as transparent or opaque and/or regions having a predefined absorption for specified wavelengths are obtained.

15 Claims, 5 Drawing Sheets

Vertically Polarized
Horizontally Polarized
Transparent ( Unpolarized)
Opaque ( Unpolarized)

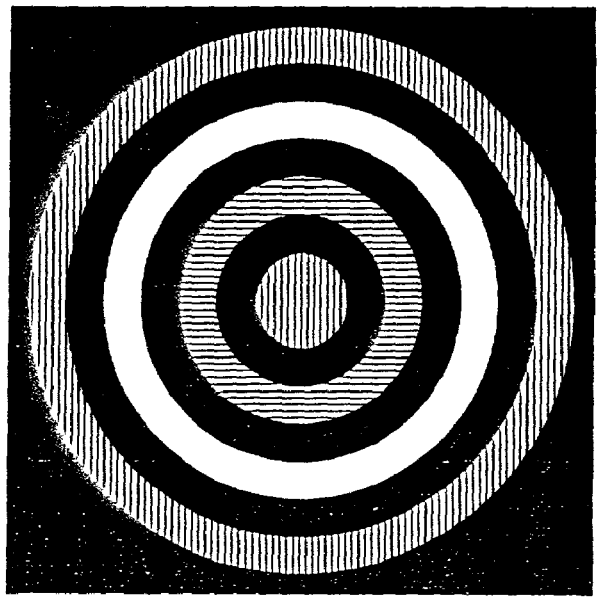
| ||||||| vertically polarized
| ≡≡≡≡ horizontally polarized
| ☐ transparent (unpolarized)
| ■ opaque (unpolarized)
Fig.2
Fig. 4
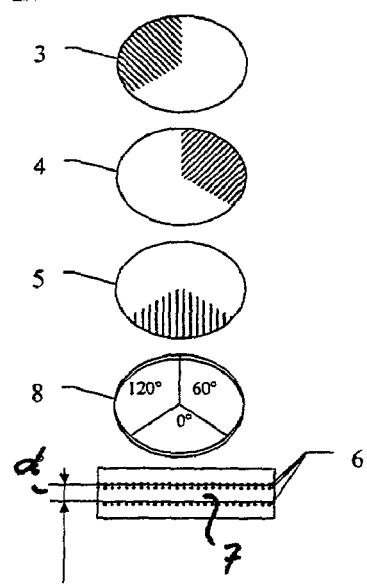
small parallax (<100μm possible for colorPol)

spectral absorption curves in
colorPol glass polarizer sensors

STRUCTURED POLARIZER AND METHOD FOR MAKING THE SAME

BACKGROUND OF THE INVENTION

1. Field of the Invention

The present invention relates to a structured polarizer (linear polarizing filter) and a method for making the same.

2. Description of the Related Art

A method is known from DE 195 23 257 A1 for producing a defined permanent change of the extinction spectrum of a dielectric materials containing metal particles by intense laser pulses, which method can be used to produce structured polarizers.

The method is based on silver-containing glasses which are irradiated with a femtosecond laser, whereby the thereby produced formed silver particles, which are responsible for the polarization, are oriented according to the polarization direction of the laser beam.

This method can be used to produce juxtaposed regions with different polarization directions, however, due to the lack of suitable lasers only for very small structures. The achievable optical densities, i.e., the degrees of polarization, are also limited. The proposed method is not capable to produce regions with complete extinction or complete transparency.

SUMMARY OF THE INVENTION

It is an object of the invention to describe a structured polarizer (linear polarizing filter) and a method for its manufacture which avoid the disadvantages of the present state of the technology, wherein (lateral) juxtaposed regions with different polarization directions, complete extinction and complete transparency, are to be arranged in a plane of the polarizer.

This object is solved by a structured polarizer, (linear polarizing filter), in which at least two superpositioned planes (polarizers) with at least one polarizer whose surface can be structured, are formed. The polarization properties of at least one of the planes are structured in such a way and the planes are mutually oriented in such a way that polarizing regions with different polarization directions and/or polarization properties, such as contrast, polarization-direction-dependent absorption properties as a function of the wavelength, and/or non-polarizing regions, such as transparent or opaque and/or regions having a predefined absorption for specified wavelengths are obtained.

The structured polarizer (linear polarizing filter) is therefore characterized in that at least two superpositioned planes (polarizers) are formed with at least one polarizer whose surface can be structured, whereby the polarization properties of at least one of the planes are structured in such a way and the planes are mutually oriented in such a way that polarizing regions with different polarization directions and/or polarization properties, such as contrast, polarization-direction-dependent absorption properties as a function of the wavelength, and/or non-polarizing regions, such as transparent or opaque and/or regions having a predefined absorption for specified wavelengths are obtained.

The method according to the invention is characterized in that at least two linear polarizing filters (polarizers) with at least one polarizing layer, which is disposed proximate to the surface and can be structured, are structured through local thermal relaxation and/or through lithographic and etching processes, that subsequently these at least two polarizing filters are exactly aligned relative to each other according to the structure and assembled in such a way that an optical component is produced which has defined optical transparent and/or optically opaque and/or polarizing regions with different polarization directions and/or polarizing properties. The etching process is preferably a chemical etching process, such as wet etching or plasma etching, or the etching process is preferably carried out by local removal of the at least one polarizing surface layer.

With the present invention, a structured polarizer can be realized which has in one plane juxtaposed regions of different polarization directions, regions of maximum polarization at different wavelengths with an identical or different polarization directions, regions without polarizing capability and regions with strong absorption.

The lateral shape of the regions is thereby arbitrary, the geometric dimensions can also be in the micrometer range.

Advantageous embodiments of the invention are described in the dependent claims.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views:

FIG. 2 a schematic diagram of a structured polarizer having a ring structure, FIG. 3 a schematic diagram of the application of the method of the invention in a first embodiment, FIG. 4 a schematic diagram of the application of the method of the invention in a second embodiment with three planes, FIG. 5 a schematic diagram of the application of the method of the invention in a third embodiment for producing dichroic structures, FIG. 6 the principle of thermal relaxation, and FIG. 7 a schematic diagram of the application of the method of the invention in a fourth embodiment as a wavelength-selective structured polarizing filter.

DETAILED DESCRIPTION OF THE PRESENTLY PREFERRED EMBODIMENTS

Figure 1:
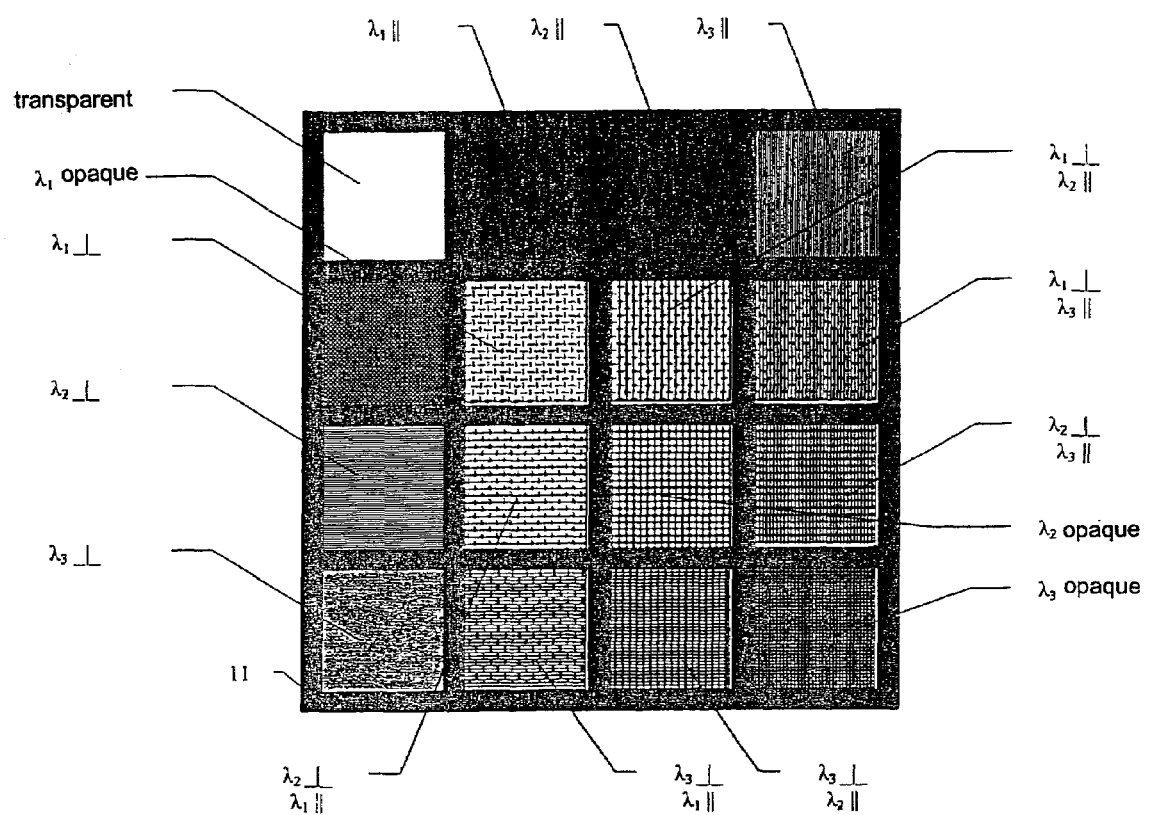
FIG. 1 a schematic diagram of different possible structures of a polarizer.

Polarizers which are structured to have juxtaposed regions with different polarization directions, polarizing regions alternating with non-polarizing regions, or with polarizing regions with complete and/or wavelength-selective absorption and capable of having arbitrary structural dimensions down to the micrometer range, have so far not be realized with known technologies and with reasonable expenditures.

While crystal polarizers and prism polarizers cannot be structured in this manner, such polarizers could be implemented with a complex technology using foil polarizers or glass polarizers by placing small customized pieces of polarizing material side-by-side in a suitable manner. Such polarizers are described in WO 99/08081. Structures with a large number of pixels are too expensive and the attainable resolution is poor.

The structured polarizer according to the present invention includes a combination of two polarizers, which are structured or connected to each other by locally introducing energy and/or by a locally removing the polarizing layer proximate to the surface, so that the polarizing layers near the surface are joined directly with optical cements.

The desired angle between the polarization directions of adjacent regions is determined by the angle, by which the two polarizers are rotated relative to each other. Since the polarizing surfaces are directly abutting each other and have a thickness of approximately one, µm the polarizers operate essentially without parallax.

By eliminating parallax, several structured polarizers of the aforedescribed type can be combined with each other, whereby the relative angles of the polarization directions between the polarizers can be arbitrary.

Starting materials for producing the polarizers according to the present invention are polarizers whose polarizing layer is located in a region proximate to the surface, i.e., within only micrometers of the surface. Such polarizers are described in Cornelius, H.-J., Heine, G., Volke, A.: "Paper 9th Triennial ITG Conference on Displays and Vacuum Electronics": "Dichroic Polarizers Based on Glass", May 2-3, 2001, and in the 12. Conference Volume of Electronic Displays '97, pp. 104-110. These are dichroic glass polarizers whose optical properties are located at the surface. According to the methods described herein, colloidal silver is produced in a region close to the surface of a sodium-silicate glass of conventional quality by exchange of the sodium ions with silver ions and subsequent reduction annealing. By tensile deformation of the glass at temperatures above $T_g$, the silver particles are simultaneously deformed in the direction of the applied tensile stress. The deformed silver particles are responsible for the polarizing properties of the glass. The wavelength of maximum polarization depends on the degree of deformation of the silver particles, and the degree of polarization depends on the density and the quantity of the stretched silver particles. The deformation of the particles can be relaxed by applying energy after the deformation. The degree of the relaxation depends on the duration and the magnitude of the applied energy, which can be increased to a point where the undeformed initial state is reached. By applying the energy locally, the material can be structured into regions having maximum polarization at different wavelengths. In this way, the orientation of the particles and therefore also the direction of the polarization are always maintained. Laser and electron beams have proven to be suitable means for locally applying energy.

Such silver-containing unstructured and structured polarizers are manufactured by the applicant under the trademark colorPol and are used in the following embodiments.

FIGS. 1 and 2 illustrate possible structures that can be produced with the method of the invention, which have arranged juxtaposed regions of different polarization directions, complete extinction and complete transparency.

FIG. 1 shows also the application of a black matrix 11, which can be realized by structuring polarizing surfaces in such a way that the polarizing regions with a 90° different polarization direction are connected so that the regions of maximum extinction form a "matrix." Another method which is applied in particular in situations where polarizers have their maximum polarization at different wavelengths, a matrix is applied on one or both polarizing surfaces by suitable methods (screen printing, evaporation). A variety of materials can be used: paint, chromium, aluminum and the like. After combining the at least two polarizers, the black matrix 11 is arranged in the interior so that it is protected and parallax-free.

FIG. 2 shows a ring structure with different polarizing regions.

Figure 3:
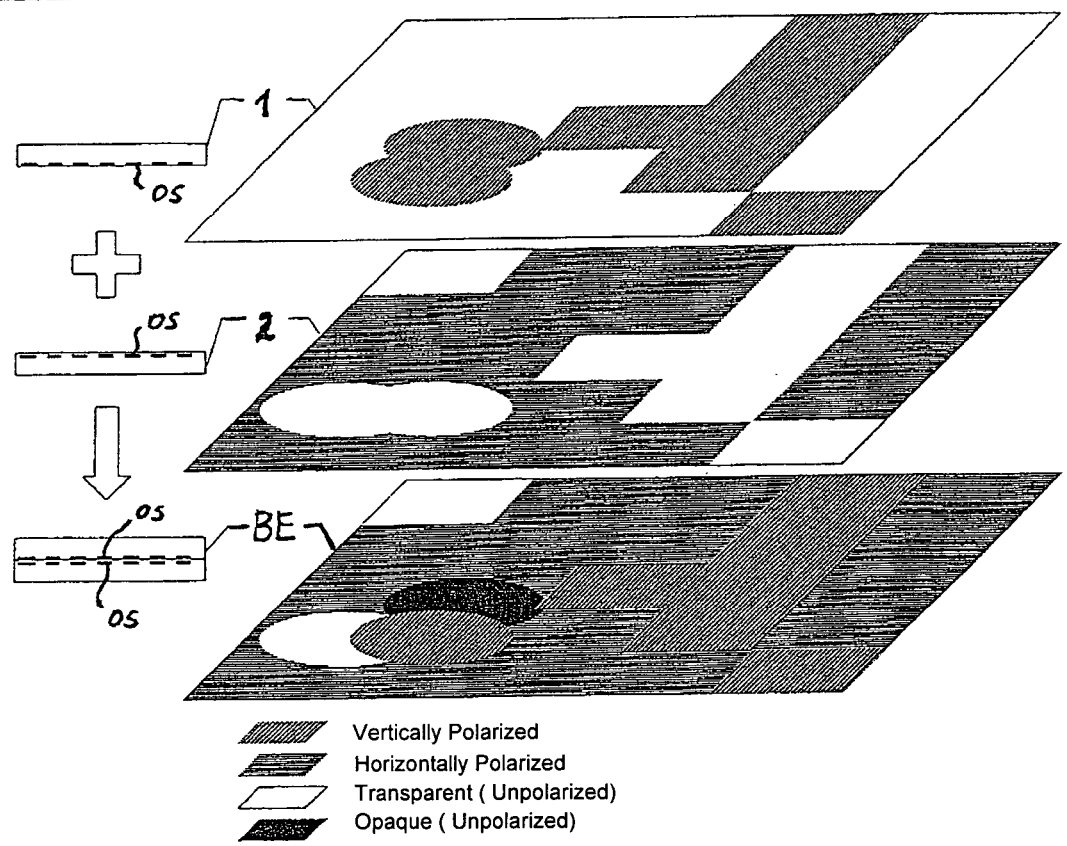

FIG. 3 depicts a first specific embodiment of the invention.

FIG. 3 depicts a first specific embodiment of the invention. The figure shows the basic possibilities of the application of the method according to the invention with two polarizing filters 1, 2, with each filter having a surface layer OS disposed of one side that produces the polarization. Such surface layer OS can be produced, for example, by only a using lithographic etch structuring process. The polarizing filters 1,2 are assembled into a component BE by rotating them 90° relative to each other so that the two polarizing surface layers OS are in direct contact with each other. The direct contact between the polarizing layers OS eliminates parallax errors.

The form of the structures (micro and macro region) can be arbitrarily selected, and the following four combinations are possible when the polarization directions of the regions relative to each other are arranged at an angle of 90°:

transparent (both polarizing layers OS removed)
opaque (none of the polarizing layers OS removed)
horizontally polarizing (layer OS of the upper polarizer 1 removed)
vertically polarizing (layer OS of the lower polarizer 2 removed)

For realizing different absorption characteristics (optical densities), the layer OS in the different regions can also be only partially removed. But this partial removal weakens the absorptivity, which produces different (smaller) contrast ratios, but in general produces higher transmission values, for both vertically and horizontally polarized light.

The second embodiment of FIG. 4 illustrates three planes 3 to 5 (three structured polarizing filters) which are arranged at relative angles of 60° and assembled to a component 8, which is advantageous, for example, for sensor applications. A small parallax can be achieved in spite of the three planes 3 to 5, if the intermediate substrate 7 which has at least one active polarizing surface layer 6 has a reduced thickness d.

The resulting component 8 is a polarizing filter with three polarizing annular segments which have polarization directions that are mutually offset by 60°.

Figure 5:
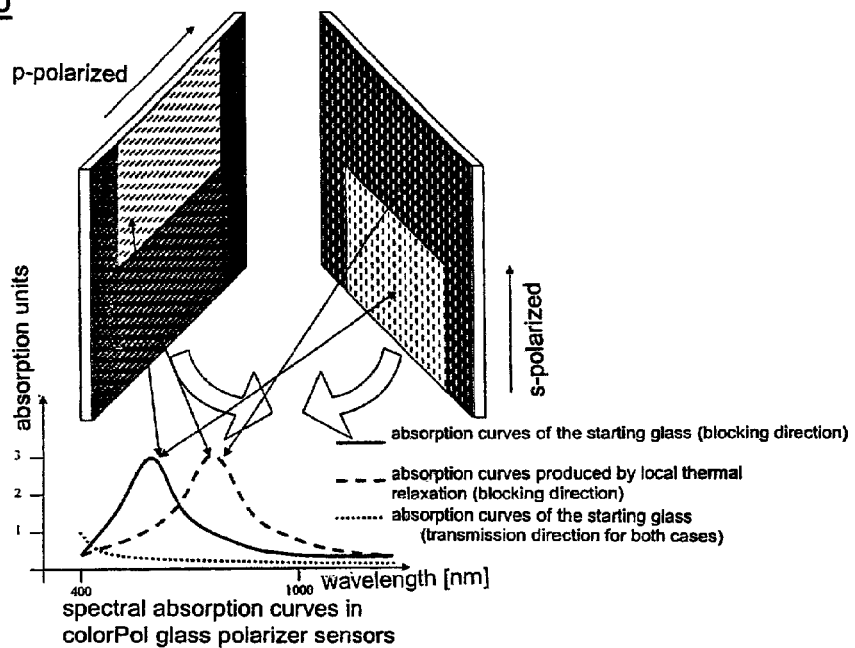
Figure 6:
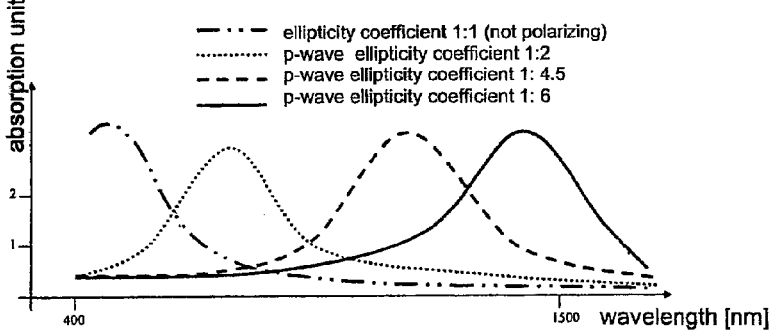

The third embodiment of FIG. 5 shows an application for producing dichroic structures in situations where the polarization manifests itself only in certain spectral regions and the wavelength at which this region is located can be locally changed. In this embodiment, the location is actively changed by displacing the absorption bands through local thermal relaxation (FIG. 6), for example with an electron beam, of the non-spherical (ellipsoidal) colloidal metal particles, which cause the absorption and are embedded in the surface of the carrier matrix, for example glass, to assume a more spherical form Alternatively, each of the two components can also be a structured polarizing filter according to the aforedescribed invention, whereby the parallax is determined by the thickness of the inner carrier substrate.

Figure 7:
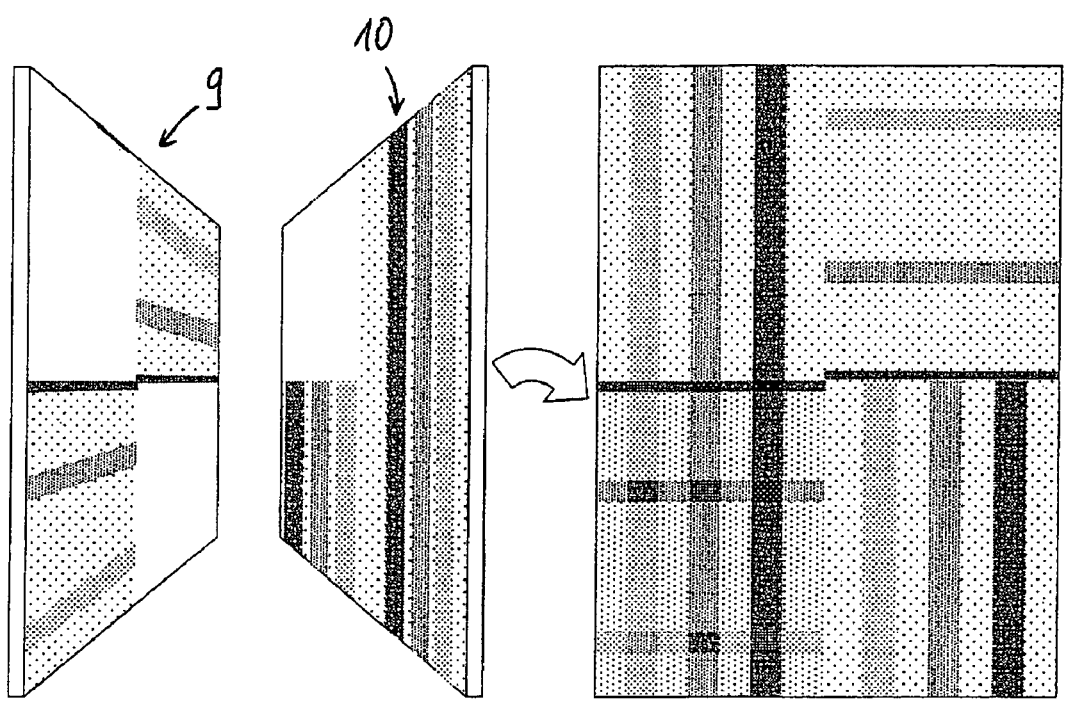

The fourth embodiment depicted in FIG. 7 is a wavelength-selective structured polarizing filter and is made preferably of two dichroic glass polarizers 10, 9 which are structured by a structuring technology (preferably a stripe structure produced by local thermal relaxation with an electron beam or laser and a quadrant structure produced by photolithography and etching), so as to produce the required properties at the desired wavelength(s). The intentional change in the polarization properties is based on the observation that the polarization is produced by uniaxially stretched and uniformly oriented particles in a dielectric environment, which in the employed dichroic glass polarizer is preferably colloidal silver in glass. When energy is applied to the glass or the glass is heated, the embedded ellipsoidal colloidal particles relax into a spherical shape. This process is accelerated by increasing the temperature which lowers the viscosity of the glass. This relaxation process can be controlled by suitable methods (electron beam technology or laser technology) so that the relaxation process can be stopped at any point between the initial eccentricity and the spherical shape (by adjusting time and energy). Since the eccentricity of the colloidal particles determines the polarization-direction-dependence of the absorption (see FIG. 6) and a local heat treatment with relaxation is possible, the polarization-direction-dependent absorption properties can be laterally structured. Such a method is conventional and described in DE 196 42 116.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A structured polarizer comprising:
   at least a first and a second planar polarizing filter, the first planar polarizing filter comprises at least a first polarizing region having a first polarization direction, wherein all polarizing regions of the first planar polarizing filter have the first polarization direction,
   the second planar polarizing filter includes at least a second polarizing region having a second polarization direction, wherein all polarizing regions of the second planar polarizing filter have the second polarization direction,
   the first planar polarizing filter also includes a first non-polarizing region,
   wherein the first and the second polarizing regions and the first non-polarizing region are arranged on the filters such that upon superpositioning, the second polarizing region is at least partially superpositioned with at least one of the first polarizing region and the first non-polarizing region, and wherein the second planar polarizing filter includes a third polarizing region having the second polarization direction, and wherein the wavelength range of polarization of the third polarizing region is different from the wavelength range of polarization of the second polarizing region.

2. The structured polarizer according to claim 1, wherein the at least first and second polarization directions are mutually offset by 90 degrees.

3. The structured polarizer according to claim 1, wherein the at least first or second polarizing region is arbitrarily structured.

4. The structured polarizer according to claim 3, wherein the arbitrary structuring is done by lithographic and chemical etching processes.

5. The structured polarizer according to claim 3, wherein the arbitrary structure is accomplished by one of local thermal relaxation with an electron beam or a laser, or by lithographic and chemical etching processes.

6. The structured polarizer according to claim 5, wherein the chemical etching process is one of wet etching or plasma etching.

7. The structured polarizer according to claim 5, wherein the chemical etching process is done by local removal of the at least one surface capable of including structured polarizing properties.

8. The structured polarizer according to claim 1, wherein the at least first or second polarizing region comprises surface layers, substantially free of parallax.

9. The structured polarizer according to claim 1, wherein the structured polarizer comprises at least a third planar polarizing filter having a region of a third polarizing direction so as to form a structure with more than two polarization directions.

10. The structured polarizer according to claim 9, wherein the polarization directions are structured such that they are rotated relative to each other by 60°.

11. The structured polarizer according to claim 9, wherein the structured polarizer is formed so as to comprise geometric dimensions in the micrometer range.

12. The structured polarizer according to claim 1, further comprising a black matrix.

13. The structured polarizer according to claim 1, wherein the polarizing regions comprise polarization-direction-dependent absorption properties as a function of the wavelength, and/or non-polarizing regions.

14. The structured polarizer according to claim 1, wherein the second planar polarizing filter includes a second non-polarizing region, and wherein the first polarizing region is superpositioned with the second non-polarizing region and the second polarizing region is superpositioned with the first non-polarizing region.

15. A structured polarizer comprising:
   at least a first and a second planar polarizing filter,
   the first planar polarizing filter includes at least a first polarizing region having a first polarization direction, wherein all polarizing regions of the first planar polarizing filter have the first polarization direction,
   the second planar polarizing filter includes at least a second polarizing region having a second polarization direction different from the first polarizing region of the first planar polarizing filter, wherein all polarizing regions of the second planar polarizing filter have the second polarization direction,
   the first planar polarizing filter furthermore includes a third polarizing region having the first polarization direction and having a wavelength range of polarization different from the wavelength range of polarization of the first polarizing region,
   wherein the first and the second polarizing regions and the third polarizing region are arranged on the filters such that upon superpositioning of the at least first and second planar polarizing filters, the second polarizing region is at least partially superpositioned with at least one of first polarizing region and third polarizing region.

* * * * *

UNITED STATES PATENT AND TRADEMARK OFFICE
CERTIFICATE OF CORRECTION

PATENT NO.        : 7,256,937 B2
APPLICATION NO. : 10/210478
DATED              : August 14, 2007
INVENTOR(S)       : Volke et al.

It is certified that error appears in the above-identified patent and that said Letters Patent is hereby corrected as shown below:

Column 3, Line 9, "one, μm" should read -- one μm, --

Column 4, Lines 3-6, "FIG. 3 depicts a first specific embodiment of the invention. FIG. 3 depicts a first specific embodiment of the invention." should read -- FIG. 3 depicts a first specific embodiment of the invention. --

Signed and Sealed this

Eighth Day of January, 2008

JON W. DUDAS
*Director of the United States Patent and Trademark Office*